Patented June 23, 1931

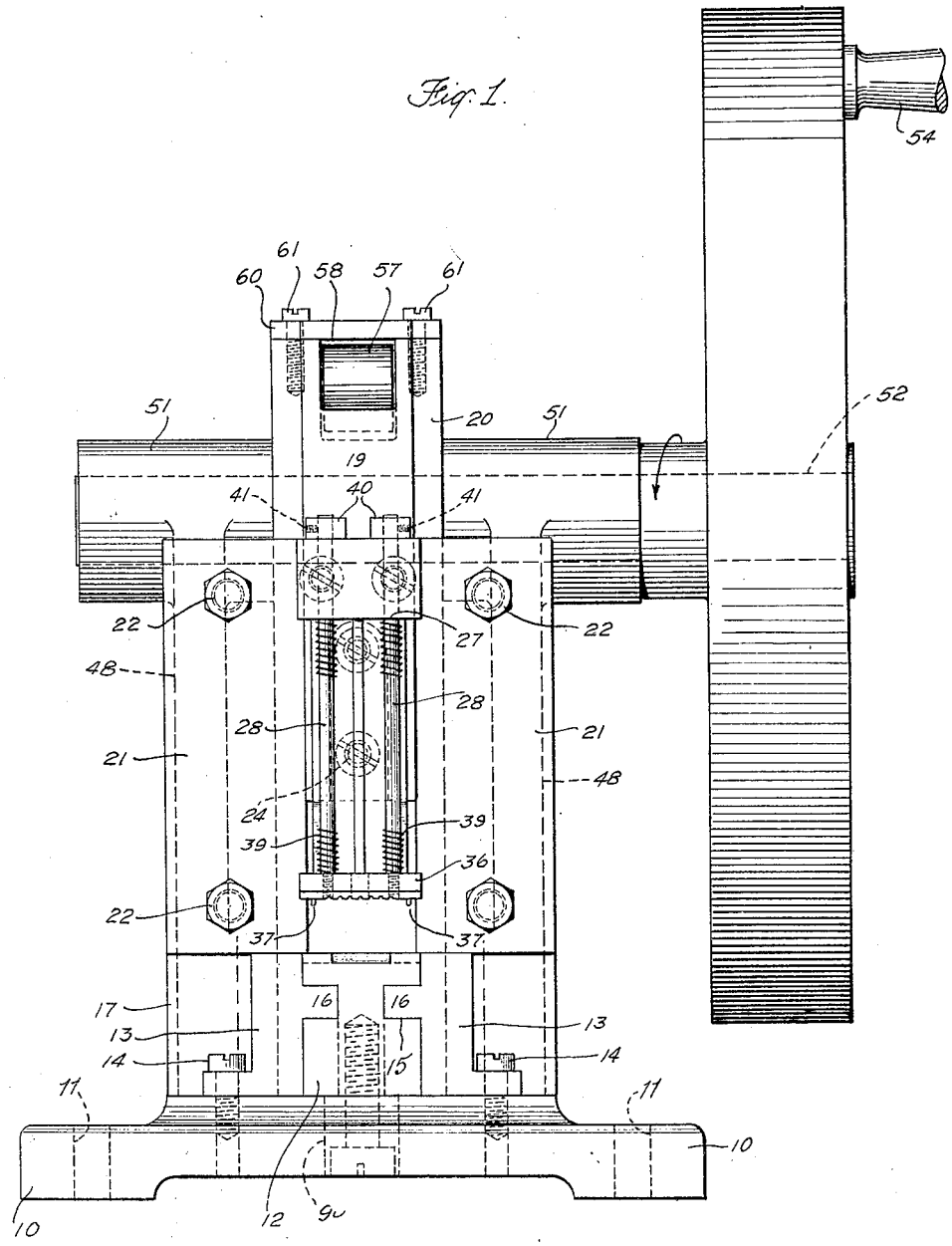

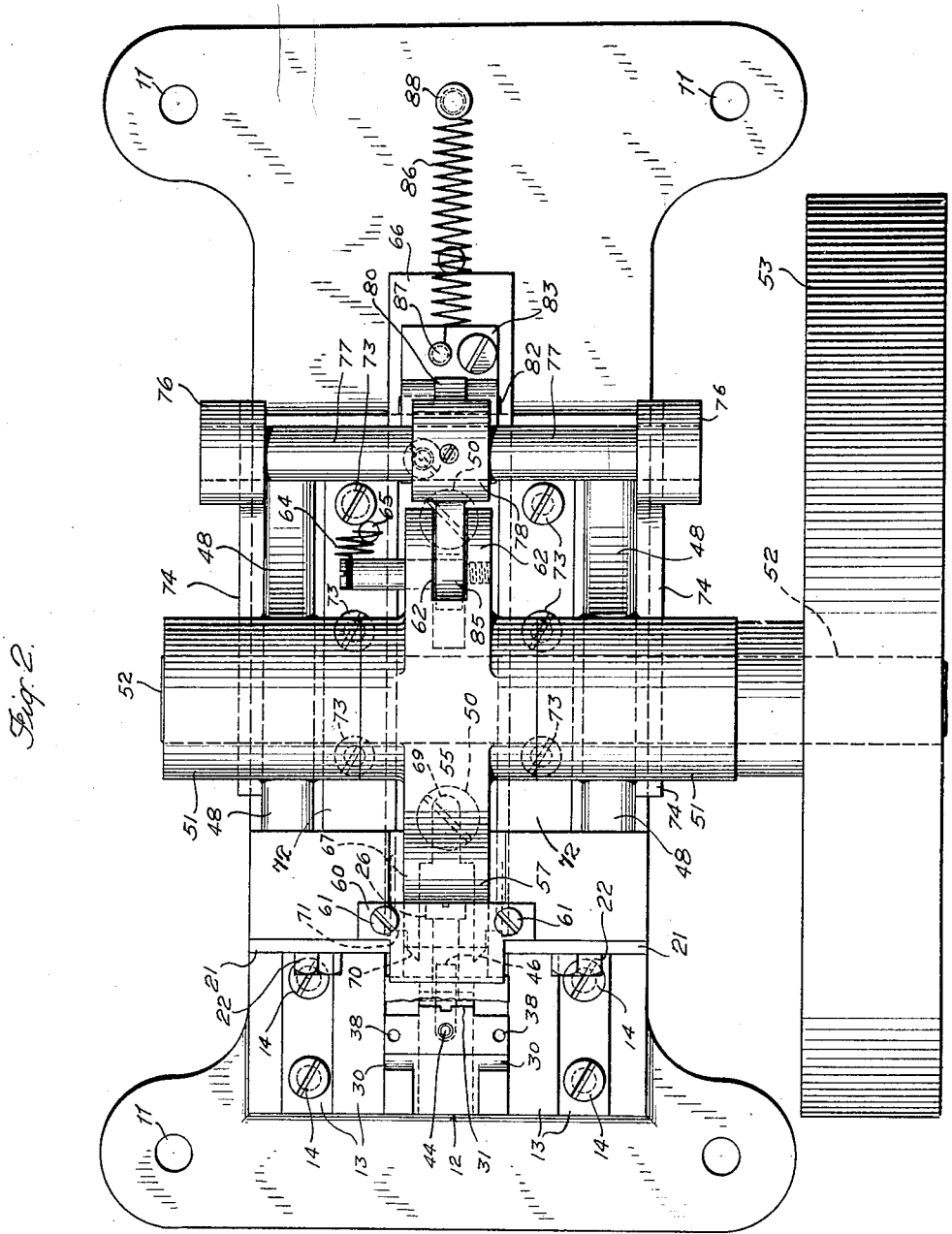

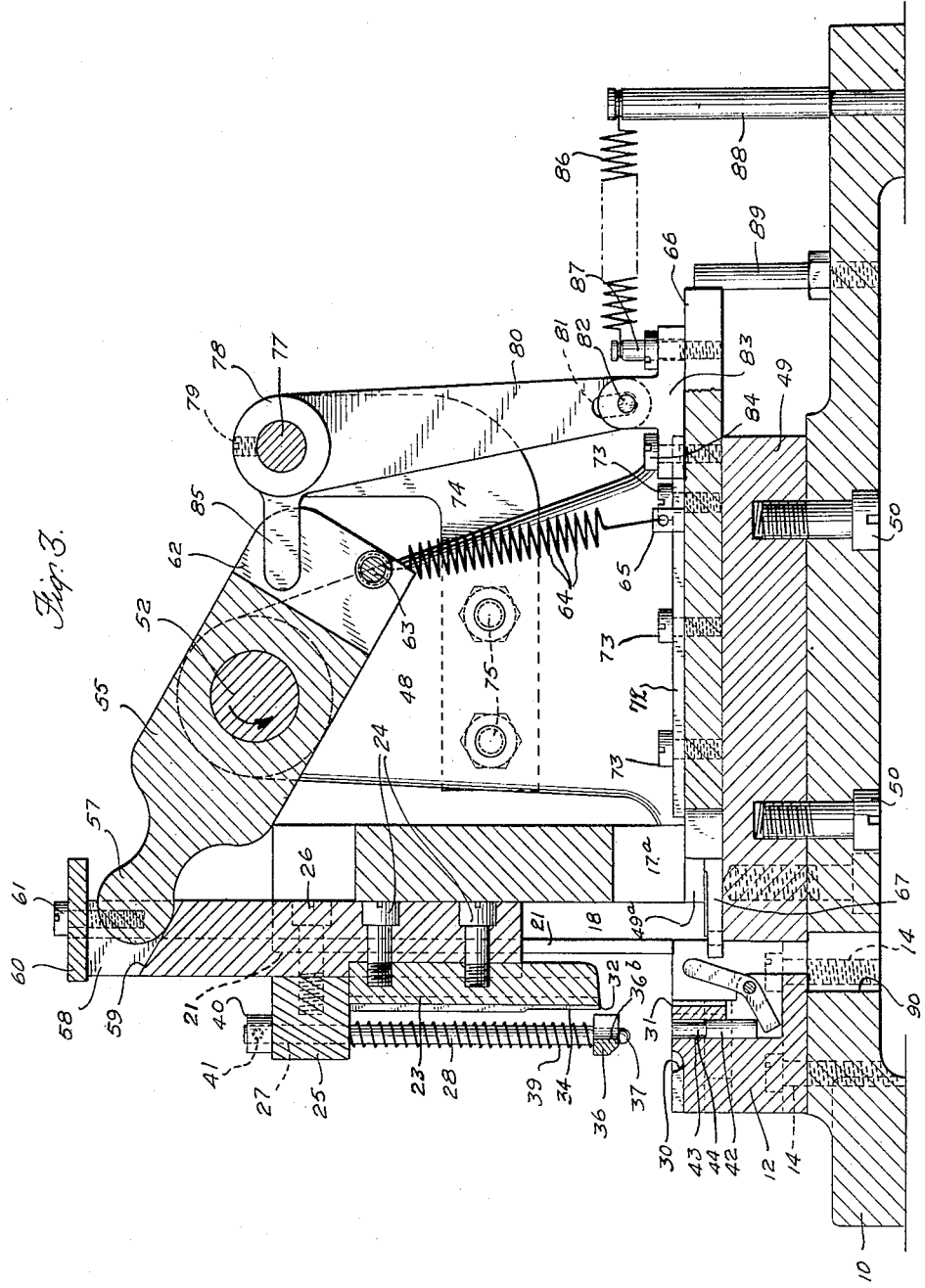

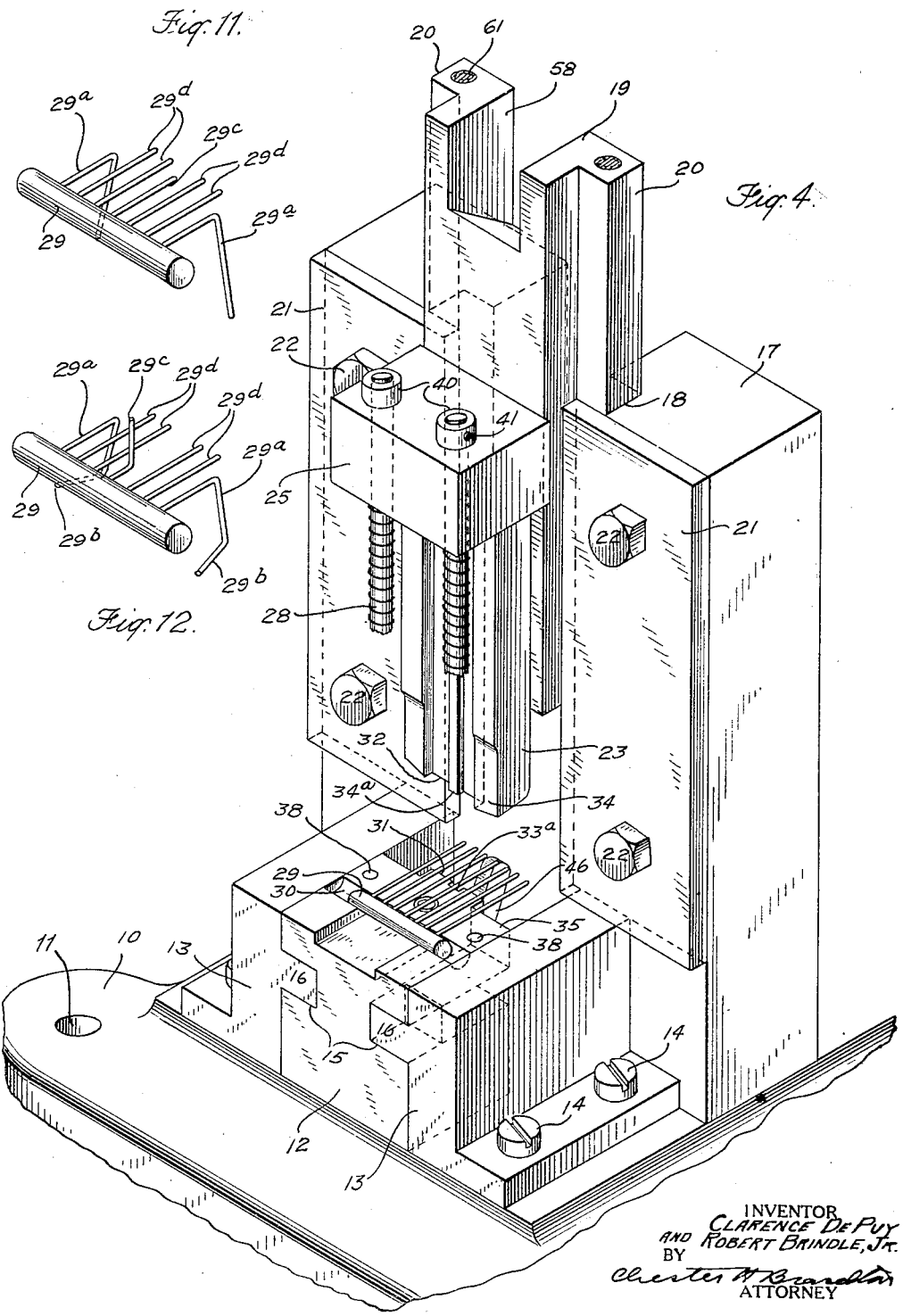

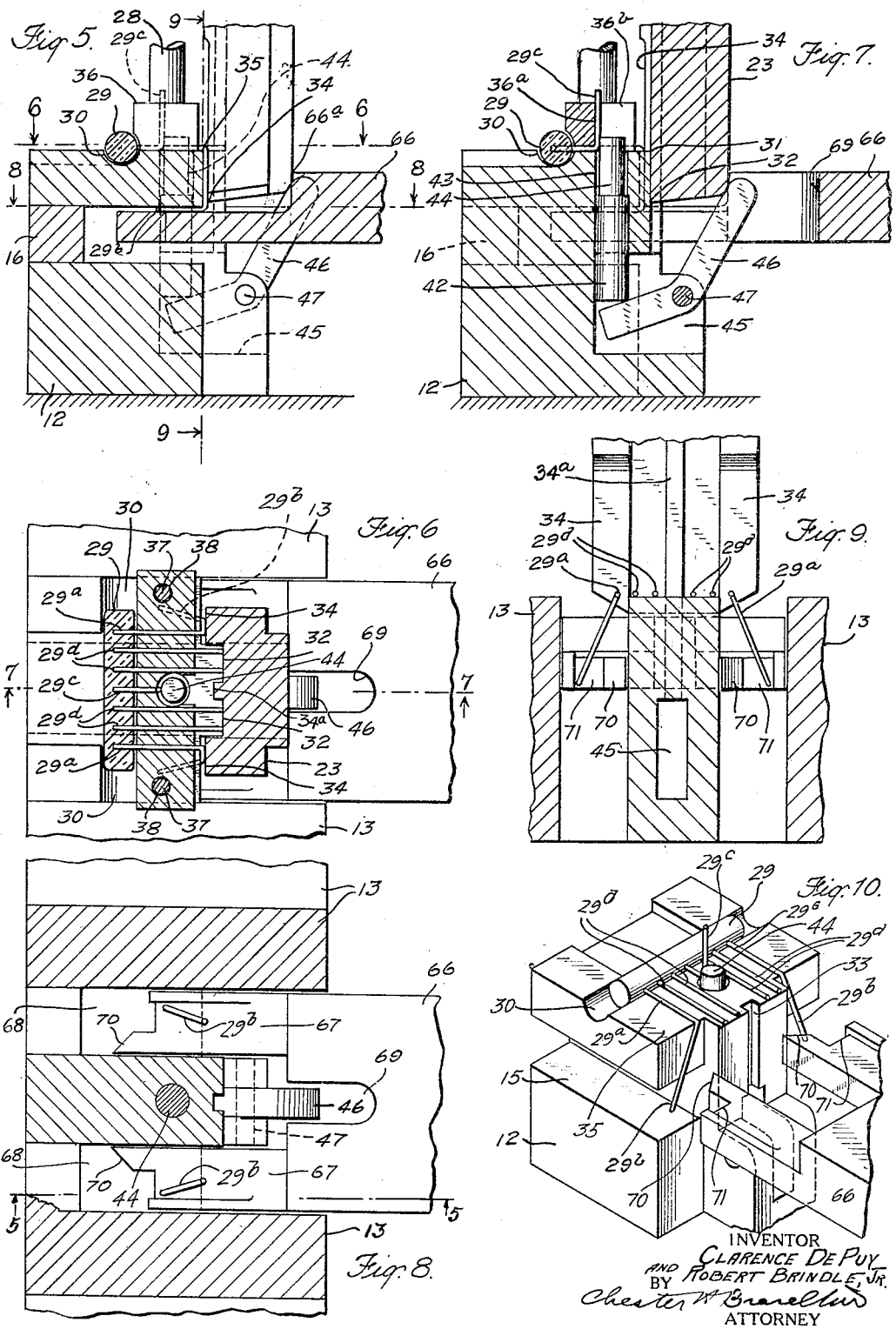

1,811,457

UNITED STATES PATENT OFFICE

CLARENCE DE PUY, OF NEWARK, AND ROBERT BRINDLE, JR., OF WEST ORANGE, NEW JERSEY, ASSIGNORS TO ARCTURUS RADIO TUBE COMPANY, OF NEWARK, NEW JERSEY, A CORPORATION OF DELAWARE

MACHINE FOR FORMING BEAD WIRES

Application filed May 16, 1929. Serial No. 363,472.

This invention relates to a machine for cutting and shaping the support wires sealed in a glass bead to be used in a vacuum tube to insulatingly space the elements thereof.

One of the objects of the invention is to provide a machine for automatically cutting the support wires sealed in the glass bead to the proper length and bending the wires into the proper shapes so that the glass bead may be quickly and easily attached to the elements of the tube without any additional bending or cutting of the wires.

Another object of the invention is to provide a machine which will automatically cut and form the support rods sealed in the bead with a single operation of the machine.

Other objects, and objects relating especially to the construction and design of the various parts of the machine will be apparent as the description thereof proceeds.

One embodiment of the invention has been illustrated in the accompanying drawings, in which, Fig. 1 is a front elevational view of the machine;

Fig. 2 is a plan view of the machine with certain portions broken away for clearness;

Fig. 3 is a center sectional elevation of the machine as shown in Figs. 1 and 2;

Fig. 4 is a perspective view of the machine showing some of the cutters and benders and having certain portions broken away for clearness;

Fig. 5 is a sectional side elevation of a portion of the machine showing the cutting and bending parts and taken on the line 5—5 of Fig. 8;

Fig. 6 is a sectional plan view of a portion of the machine taken on the line 6—6 of Fig. 5;

Fig. 7 is a sectional side elevation of the cutting and bending parts of the machine taken on the line 7—7 of Fig. 6;

Fig. 8 is a sectional plan view of the cutting and bending portions of the machine taken on the line 8—8 of Fig. 5;

Fig. 9 is a front sectional elevation of the cutting and bending portions of the machine taken on the line 9—9 of Fig. 5;

Fig. 10 is a perspective view of a portion of the machine showing the supporting platform with a bead in place and a portion of the bending and cutting operations completed;

Fig. 11 is a perspective view of a glass bead with the cutting operation completed and a part of the bending operation completed; and Fig. 12 is a perspective view of the bead completed.

Referring now more specifically to the drawings, the machine comprises a base plate 10 which may be provided with suitable holes 11 for attaching the base plate to the top of a bench or other support. A die 12 is adjustably secured to the base plate 10 by means of two clamping guides 13 spaced on either side of the die 12 and secured to the base plate by suitable screws 14. The die 12 may be slotted at 15, if desired, and longitudinal flanges 16 may be provided on the guide members 13 to fit in the slots 15 of the die member. With this construction the die may be moved backward and forward in the machine in order to get the proper adjustment, and is rigidly held in position when the screws 14 are tightened.

A rectangular block 17 is positioned directly behind the die holding members 13, extending somewhat beyond the side edges thereof and rising to a considerable height above the die 12. This block is provided with a groove 18 extending centrally down the face thereof and is adapted to receive a plunger 19 which has a flange 20 at each side thereof adapted to fit into the slot 18 in the block 17. A pair of plates 21 are secured over the face of the block 17 on each side of the plunger 19 and cover the flanges 20 on the plunger, thereby limiting the movement of the plunger to a vertical plane. These plates 21 may be secured against the block 17 by means of stud bolts 22. The plates 21 preferably extend downwardly no further than is necessary to secure the plunger 19 in position, and have been shown as terminating just above the upper ends of the die-holding members 13.

A cutting and bending die 23 is rigidly secured to the plunger 19 by means of screws 24, and a head 25 is also rigidly secured to the plunger 19 above the cutting and bending die 23 by means of screws 26 which pass through holes in the plunger 19. The head 25 extends outwardly and forwardly beyond the front surface of the cutting and bending die and is provided with a pair of holes 27 through which rods 28 are adapted to pass, there being a sliding fit between the rods and the head 25.

The cutting and bending die 23 is arranged to cooperate with the die member 12 so as to cut off certain of the wire supports sealed in the bead and bend certain others of the supports downwardly. As indicated in Fig. 4, the bead to be operated upon comprises a glass rod 29 which has seven straight wires sealed in it. A notch or recess 30 is provided in the die member 12 transversely across the top thereof to receive the bead 29, and when the bead is placed in this recess the wires lie along the surface of the die and project rearwardly beyond the rear edge thereof. In the present instance it is desired to cut off five of the seven wires shown and bend downwardly the two outside wires 29a later giving the ends 29b of these two outside wires a forward bend. It is also desired to bend the central wire 29c upwardly. The rear surface of the die 12 is therefore provided with a cutting edge 31 and the lower end of the cutting and bending die 23 is provided with a cutting edge 32 adapted to cooperate with the cutting edge 31 to cut off the two wires 29d on each side of the central wire. It is desired to cut the central wire 29c at a slightly less length than the others, and hence a recess 33 is provided in the die 12 with a cutting edge 33a similar to the edge 31. The central portion of the cutting edge 32 on the cutting and bending die 23 is brought forward to form another cutting edge 34a which cooperates with the cutting edge 33a on the die 12 to cut off the central wire a little shorter than the others. The outer edges of the cutting and bending die 23 are provided with cam surfaces 34 which are spaced sufficiently from the outer edges 35 of the die member 12 to permit the end wires 29a to be bent downwardly without cutting. It will be noted that the surfaces 34 are inclined slightly outwardly, so that instead of bending the end wires directly downwardly they are diverted somewhat toward either side, so that they form the construction shown in Fig. 11.

In order to hold the bead and attached wires in position while the plunger is descending, we have provided a holder 36 rigidly mounted at the lower end of the rods 28. The holder 36 is provided at its lower surface with a pair of short dowels 37 which are adapted to co-operate with recesses 38 provided in the die 12 to center the holding member upon the bead and attached wires. The holder 36 is rounded off at its lower forward edge, so that it does not interfere with the glass bead 29 and its lower surface has a plurality of grooves for spacing the wires. Springs 39 are provided around the rods 28 and bear at their lower ends against the holder 36, and at their upper ends against the head 25. The ends of the rods 28 projecting above the head 25 are provided with sleeves 40 which may be securely held to the ends of the rod by set-screws 41. Inasmuch as the rods 28 have a sliding fit with the head 25, it will be evident that the holder 36 may be moved upwardly with respect to the head 25 against the tension of the springs 39, the rods 28 moving through the head and thus the holder 36 is urged toward its lowermost position. When the plunger 19 is forced downwardly, it will be evident from an inspection of Fig. 3, that the holder 36 will strike the wires sealed in the glass bead 29 before the cutting edges touch the wires, and then, as the cutting and bending edges pass across the ends of the wires, the holder may move upwardly, borne down always by the force of the springs 39.

It is desired to bend upwardly the central wire, and to this end a plunger 42 is provided in an opening 43 in the die member 12. The plunger 42 is mounted for vertical operation only, and as is evident from an inspection of Fig. 3, may be forced upwardly out of the die 12. The action of this plunger may be more readily seen in Fig. 7, wherein the upper end 44 of the plunger is indicated as being smaller in diameter, so that it will just permit the central wire to lie between it and the surface 36a of the holder, formed by a recess 36b, which is flush with the forward surface of the opening 43. A large recess 45 is provided in the die member 12 and connects the lower end of the opening 43 with the rear surface of the die 12. In this recess 45 is pivotally mounted an angular arm 46, by means of a pivot 47. The lower end of this arm extends forwardly beneath the plunger 42, while the upper end extends rearwardly and upwardly to a point just below the horizontal level of the cutting edge of the die 12 and is inclined at an angle as indicated in Fig. 7. When the plunger 19 descends, the rear edge of the cutting and bending member 23 strikes the upper end of the lever 46, causing it to rotate in a clockwise direction as seen in Fig. 7, and to push the plunger 42 upwardly, thereby bending the central wire about the lower rear edge of the holder 36. It will be noted, however, that the lever 46 is not engaged until the cutting and bending die has passed and cut the five central wires.

A pair of plates 48 are arranged spaced parallel to each other and integral with a plate 49, the whole being secured to the base plate 10 by means of the screws 50 which engage the central plate 49. The plate 49 extends forwardly at its center beyond the upright plates 48 and the block 17 is cut out at its lower end to form an opening 17a in which the plate 49 is positioned. This is clearly shown in Fig. 3. The plates 48 extend upwardly adjacent the side of the base plate 10 and are provided at their upper ends with bearing members 51 which are aligned to receive the shaft 52. The shaft 52 is long enough to extend out one side of the machine, and a wheel 53 is provided rigidly secured to the shaft having a handle 54 near the periphery thereof, so that the operator may grasp the handle to rotate the shaft 52. It is preferable to utilize a wheel 53 for operating the several parts by a single movement thereof, as a wheel is very conveniently manipulated and because a wheel will have a certain inertia which will insure complete operation of the several dies, and not depend entirely upon the operator holding the wheel and pulling it to the end of its stroke.

An arm 55 has a central enlarged bearing 56 and is mounted upon the shaft 52 and rigidly attached thereto. The arm 55 has a forward extension in the form of a knob 57 having rounded upper and lower edges, which is adapted to have a loose bearing movement in the top of the plunger 19, a recess 58 being provided for that purpose. The lower surface 59 of the recess 58 is inclined upwardly towards the front of the machine, and when the arm 55 is rotated in a counter-clockwise direction, as indicated by the arrow in Fig. 3, the rounded end 57 of the arm has a sliding action upon the surface 59 of the plunger. The plunger is provided with a top plate 60 held in position by screws 61 which closes the recess 58 and permits the plunger to be raised when the rounded end 57 of the arm 55 bears upwardly against the plate which happens when the arm is rotated in a clock-wise direction. The other and lower end of the arm 55 is bifurcated to form a pair of broad fingers 62 between which at the lower corner a pin 63 extends. A spring 64 may be attached to the pin 63 at one end, and at the other to a pin 65 rigidly secured to the plate 49, so that the arm 55 is always urged to its furthest position in a clockwise direction, as shown in Fig. 3, with the rounded end 57 up, and, therefore, the plunger raised.

The plate 49 is provided with a central longitudinal keyway 49a in which a plunger 66 is slidably mounted. The forward end of the plunger 66 is bifurcated to form a pair of bending arms 67, Fig. 8. The bending arms 67, when the plunger 66 is moved forward, enter recesses 68 provided for that purpose in the die member 12 straddling the central portion of the die member and the plunger 42 and lever 49 for operating it. An additional groove 69 is provided in the central forward portion of the plunger 66 to prevent the plunger from striking the lever 46.

Each of the arms 67 is provided with a cam surface 70 inclined from the central edge to the rear and adapted to push the ends 29b of the outer wires 29a toward the side in case they have not already been pushed in that direction when the plunger 19 and accompanying cutting and bending die 23 comes down. Additional surfaces 71 are provided on the ends of the arms 67, which are perpendicular to the longitudinal axis of the plunger 66, and are spaced slightly to the rear of the cam surfaces 70. The arms 67 are reduced in thickness compared to the plunger 66, and the upper surface of these arms is spaced the thickness of one of the support wires from the upper surface of the recess 68, and hence, when the plunger 66 moves forward the arms 67 engage the ends 29b of the wires 29a and bend them forwardly, the wire occupying the space between the top of the arms 67 and the upper surfaces of the recesses 68. Inasmuch as these wires are already bent downwardly and slightly outwardly, the surfaces 71 of the arms 67 will not bend the wires absolutely in a forward direction but the wires will slide along the surfaces 71 towards the outer edges thereof, and the result will be that the ends of the wires will be bent outwardly as well as forwardly and will assume the position as indicated in Fig. 12. Thus the bent ends 29b of the wires are not parallel to the other wires or to that portion of the wires nearest the bead. A plate 72 is provided for holding the plunger 66 in proper position in the keyway provided for it, and may be held against the block 49 at either side by screws 73.

Angular brackets 74 are secured to the outer sides of the plates 48 by means of stud bolts 75. These brackets 74 are provided with bearings 76 at the upper ends thereof which are aligned to receive the shaft 77 which is rotatably mounted therein. An arm 78 is mounted at the center of the shaft 77 and rigidly attached thereto by means of the setscrew 79. The arm 78 has a downwardly extending portion 80 which is provided with a slot 81 which is adapted to receive a pin 82 rigidly held by a bifurcated bearing member 83 attached to the plunger 66 by means of stud bolts 84. The upper end of the arm 78 is provided with a substantially right angular extension 85 which is directed forwardly and falls in the space between the two fingers 62 of the arm 55 and directly above the pin 63. When the shaft 52 is rotated counter-clockwise, as seen in Fig. 3, and the plunger 19 is moved downwardly until the cutting edges of the cutting die 23 pass the upper edge of the die 12, the pin 63 strikes the extension 85 on the arm 78, causing the arm to pivot in a clockwise direction about the shaft 77, with the result that the plunger 66 is driven forwardly, thereby bending the two outer wires which have already been bent downwardly in a forwardly direction. A spring 86 is attached to a pin 87 provided on the end of the plunger 66, and the other end of the spring is attached to a pin 88 which is mounted upon the rear end of the base plate 10, and the plunger 66 is therefore moved forwardly against the tension of the spring 86 which returns it to its proper position when the shaft 52 is turned in a clockwise direction, so as to move the pin 63 away from the end of the extension 85. A suitable stop pin 89 is provided on the base plate 10, as indicated, to limit the rearward movement of the plunger 66.

From the foregoing it will be clear that the operation of the device is as follows:

A glass bead 29 having the seven wires sealed therein is placed on the die 12 so that the bead falls in the recess 30, and the wires extend towards the rear of the machine. The operator then grasps the handle 54 and pulls it toward him, thereby rotating the shaft 52 in a counter-clockwise direction, as seen in Fig. 3. The rounded end 57 of the arm 55 then engages the cam surface 59 on the plunger 19 and the plunger moves downwardly. The holder 36 first engages the wires of the bead and these wires, if not in exactly the right position, will be straightened by the grooves in the holder. The plunger 19 continues to move downwardly the rods 28 secured to the holder 36, passing up through the holes for that purpose in the head 25.

The cutting and bending member or die 23 next engages the wires and the two wires 29d on each side of the central wire 29c are severed by the cutting edges 32 and 31 which co-operate for that purpose. The central wire is at the same time severed by the cutting edges 34a and 33a. A suitable opening 90 is provided in the base plate 10 to permit the cut wires to fall therethrough.

The plunger 19 continues to move downwardly and the cam surfaces 34 now engage the end wires 29a, bending them downwardly over the corner 35 forming the rear edge of the die 12, and outwardly due to the inclination of the bending surfaces.

As the plunger 19 and bending and cutting die 23 continue to move downwardly the die strikes the upper end of the angular lever 46, causing this lever to rotate in a clockwise direction, as indicated in Fig. 7, and forcing the plunger 42 upwardly, thereby causing the central wire to bend upwardly about the rear edge of the holder 36.

Meanwhile and after the plunger 19 and the bending and cutting die 23 has moved down enough so that the middle wire has been cut and the end wires have been bent downwardly, the pin 63 on the arm 55 strikes the extension 85 on the arm 78, causing the arm 78 to rotate in a clockwise direction, as viewed in Fig. 3, about the shaft 77. The arm 80 bears against the pin 82 supported in the bracket 83 and causes the plunger 66 to move forwardly. The cam edges 70 on the arms 67 which form the ends of the plunger 66 bend the ends 29d of the end wires outwardly if they are not already so bent, and the bending edges 71 then force the wires forwardly against the upper surface of the recesses 68.

As the plunger 66 moves forward the bending and cutting die 23 is still moving downwardly and the arms 67 of the plunger 66 move under the die, but the die finally engages the shoulder 66a formed by the lesser thickness of the arms 67, as indicated in Fig. 5. This forms a means to stop the forward motion of the machine. The operator then releases his hand and the spring 64 pulls the arm 55 in a clockwise direction, together with its attached shaft and hand wheel, and raises the plunger 19 and associated parts. At the same time, as soon as the pin 63 has moved away from the arm 85 the spring 86 draws the plunger 66 rearwardly until it reaches the stop pin 89. The weight of the plunger 42 causes it to drop, thereby returning the angular lever 46 to the position as indicated in Fig. 3, and the machine is ready to receive another bead for a similar operation.

While we have found it desirable to construct the machine in such a manner that it will bend upwardly the central wire of the bead and downwardly the two outer wires of the bead, leaving the two wires on each side of the central wire cut off at a certain length but unbent, it is obvious that the parts of the machine might be rearranged so that the wires will be cut and bent in a different manner without departing in any way from the spirit of the invention. Other changes may be made in the machine and in the method of operating it, and we do not desire, therefore, to limit the invention to what has been shown and described, except as defined by the appended claims.

What we claim is:

1. In a machine for forming a plurality of wires, means to clamp said wires in position, means to cut off some of said wires, means to bend some of said wires in one direction, and means to bend some of said wires in another direction, said cutting and bending operations being performed while the wires are clamped in position.

2. In a machine for forming a plurality of spaced wires, means for holding said wires, means for cutting off one of said wires, means for bending downwardly another of said wires, and means for bending upwardly another of said wires.

3. In a machine for forming a plurality of wires, means for holding said wires, means for bending one of said wires downwardly and laterally, means for bending the end of said wire forwardly, and means for bending another of said wires upwardly.

4. In a machine for forming a plurality of spaced wires, means for holding said wires, means for bending one of said wires downwardly and laterally, and means for bending the end of said wire forwardly.

5. In a machine for forming a plurality of spaced wires, means for holding said wires, means for cutting one of said wires, means for bending downwardly another of said wires, means for bending the end of said wire forwardly, means for bending another of said wires upwardly, and a single manual control for operating all of said means with a single manipulation of said control.

6. In a machine for forming a plurality of wires, a die member, means to receive the wires upon the top of said die member and extending beyond the rear edge thereof, means to hold said wires in position on the top of said die member, means to bend one of said wires downwardly over the edge of said die member, said die member having a recess in the rear surface thereof, and means to bend the end of said wire forwardly into said recess.

7. In a machine for forming a plurality of spaced wires, a die member having a cutting edge on the rear surface thereof, means to hold said wires on the die member over the cutting edge, a second die member co-operating with said first die member and having a cutting edge thereon, means to move said second die member with respect to said first die member so that one of said wires is severed when said second die member moves past said first, a cam surface on said second die member whereby one of said wires is bent downwardly when said second die member moves past said first die member, and means to bend the end of the wire so bent in a forwardly direction.

8. In a machine for forming a plurality of spaced wires, a die upon which the wires are adapted to be positioned, a vertically moving plunger adapted to bend one of said wires when said plunger is moved into co-operation with said die, a horizontally movable plunger adapted to bend one of said wires forwardly when said plunger is moved into co-operation with said die, and means for successively moving said plungers.

9. In a machine for forming a plurality of spaced wires, a die for receiving said wires, a vertically moving plunger, a cutting surface on said plunger adapted to sever one of said wires as said cutting surface is moved down past said die, a cam surface on said plunger adapted to bend one of said wires as said plunger is moved down past said die, a second vertically mounted plunger mounted on the opposite side of said wires from said first plunger, means to move said first plunger downwardly past said die, and means to thereafter move said second plunger upwardly past said die, whereby one of said wires is severed, another of said wires is bent downwardly, and still another of said wires is bent upwardly.

10. In a machine for forming a plurality of spaced wires, a die member for receiving the wires to be formed, a vertically movable plunger, a holder resiliently supported on said plunger and adapted to hold said wires in position on said die, a cutting edge on said plunger adapted to sever one of said wires when said plunger is moved past said die, a cam surface on said plunger adapted to bend one of said wires downwardly when said plunger is moved past said die, a second plunger vertically mounted on the opposite side of said wires from said first plunger, means to operate said first plunger, and means to operate said second plunger after said first plunger has passed said wires.

11. In a machine for forming a plurality of spaced wires, a die member for receiving the wires to be formed, a vertically movable plunger, a cutting edge on said plunger and adapted to sever one of said wires when said plunger is moved past said die, a second plunger vertically movable and mounted on the opposite side of said wires from said first plunger, means cooperating with said first plunger to move the second plunger after said first plunger has passed said wires, whereby the movement of said plunger severs one of said wires and thereafter bends it in a direction opposite to the direction of movement of the severing edge, and means to move said plunger.

12. In a machine for forming a plurality of spaced wires, a die member for receiving said wires, a vertically movable plunger, a cam surface cooperating with said die member to bend one of said wires in the direction of the movement of said plunger, a horizontally mounted plunger, a cam surface on said plunger adapted to engage the end of the wire bent in the direction of said first plunger and bend it transversely in a direction reverse to the main portion of said wire, means to move said first plunger, and means cooperating with said first mentioned means to move said second mentioned plunger after said first mentioned plunger has bent said wire in the direction of its movement.

13. In a machine for forming a plurality of wires, a die member to receive said wires, a plunger mounted for vertical reciprocation, a cam surface on said plunger adapted to bend one of said wires downward in the direction in which said plunger is moving, said surface being slightly inclined so as to give said wire a slight sidewise bend in addition to the downward bend, a second plunger mounted for horizontal reciprocation, a cam surface on said second plunger adapted to bend the end of said wire in a direction reverse to the main portion of said wire, means to move said first plunger, and means associated with said first mentioned means to move said second plunger after said first plunger has bent said wire in a direction of its movement.

14. In a machine for forming a plurality of spaced wires, a die for receiving said wires, a plunger mounted for vertical reciprocation, a cutting edge on said plunger adapted to cut one of said wires as said plunger is moved past said die, a cam edge on said plunger adapted to bend another of said wires in the direction of movement of said plunger, a second vertically mounted plunger on the opposite side of said wires from said first plunger, a lever pivotally mounted and contacting with said second plunger and adapted to move said second plunger in a direction opposite to the movement of said first plunger when said first plunger engages the other end of said lever, the end of said lever being beneath said wire, whereby when said wire is severed by the cutting edge on said plunger said second plunger moves in a direction opposite to the movement of said first plunger and said wire is bent in a direction corresponding to the movement of said second plunger, a third plunger mounted for horizontal reciprocation, a cam surface on said third plunger and adapted to engage the end of said first mentioned wire and bend it in the direction of movement of said third plunger, means to move said first mentioned plunger, and means cooperating with said moving means to move said horizontally reciprocable plunger after said first plunger has severed said wire and bent said other wire.

15. In a machine for operating on a plurality of spaced wires, a die for receiving said wires, a vertically movable plunger on one side of said wires, a cutting edge on said plunger adapted to sever one of said wires when said plunger is moved past said die, a cam surface on said plunger and adapted to bend one of said wires in the direction of movement of said plunger when said plunger is moved past said die, a holder resiliently mounted on said plunger and adapted to engage and hold said wires before said plunger comes in contact therewith, a second vertically mounted plunger mounted on the opposite side of said wires from said first plunger, a lever pivotally mounted adjacent said plunger and engaging said plunger at one end thereof, the other end of said lever being positioned so as to intercept the movement of said first mentioned plunger, whereby said second mentioned plunger is moved in the opposite direction from said first mentioned plunger, the end of said lever being spaced from said wires so that said first mentioned plunger contacts with said wires before said second mentioned plunger moves, a third plunger mounted for horizontal reciprocation, a cam surface on said third plunger and adapted to engage the end of said bent wire and bend it in the direction of movement of said plunger, means to move said first plunger, and means controlled by said moving means to move said third plunger after the function of said first plunger has been completed.

In testimony whereof, we affix our signatures.

CLARENCE DE PUY.
ROBERT BRINDLE, Jr.